No. 669,974. Patented Mar. 19, 1901.
M. BARR.
UNIVERSAL JOINT.
(Application filed Jan. 29, 1900.)
(No Model.)
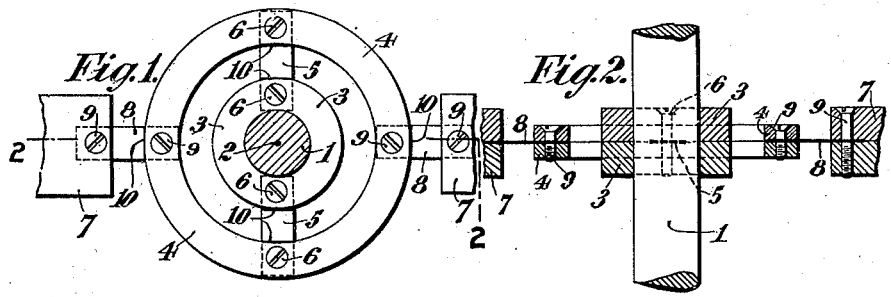
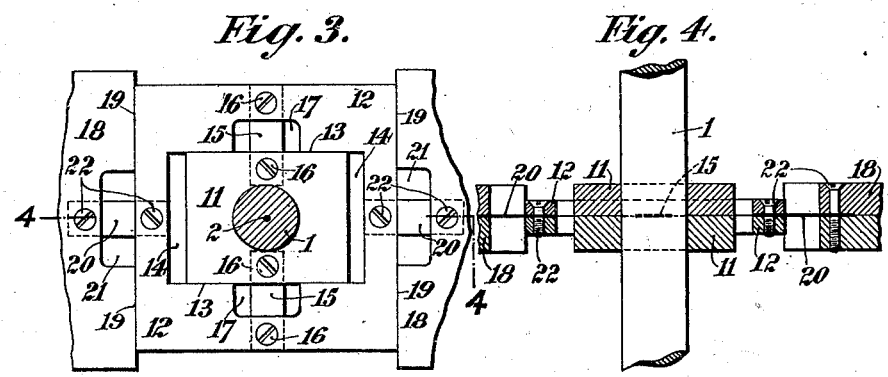
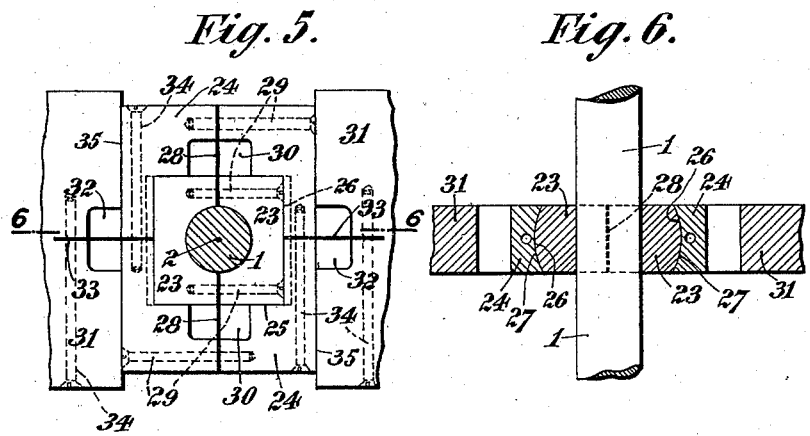
Witnesses.
Robert E. McLaren.
Harry L. Cot
Inventor
Mark Barr.
per Woodroffe
Attorney.

UNITED STATES PATENT OFFICE.

MARK BARR, OF BROADHEATH, ENGLAND, ASSIGNOR TO THE LINOTYPE COMPANY, LIMITED, OF LONDON, ENGLAND.

UNIVERSAL JOINT.

SPECIFICATION forming part of Letters Patent No. 669,974, dated March 19, 1901.

Application filed January 29, 1900. Serial No. 3,209. (No model.)

*To all whom it may concern:*

Be it known that I, MARK BARR, of the Linotype Works, Broadheath, in the county of Chester, England, have invented certain new and useful Improvements in Universal Joints or Gimbals; and I do hereby declare the following to be a full, clear, and exact description of the invention, such as will enable others skilled in the art to which it appertains to make and use the same.

The present invention relates to improvements in universal joints or gimbals. According to it, the inner portion of the joint, being the equivalent of the inner gimbal-ring or of the ball of a ball-and-socket joint, is connected by two ribbons or thin flat flexible webs or plates of steel or equivalent elastic material to an external ring or frame. The said ribbons are opposite to each other and in the same plane. The ring or frame is connected in exactly the same way as is the above-mentioned inner portion to it to a pair of blocks which are stationary as far as the combination of the said ring or frame and inner portion is concerned. The two ribbons so connecting the ring or frame to the pair of blocks are opposite to each other and at right angles with the first-mentioned pair, because each pair is required to constitute an axis of oscillation, and such two axes must obviously be at right angles with each other.

Referring to the accompanying figures, which are to be taken as part of this specification and read therewith, Figure 1 is a plan, partly in section, of a round-ring joint with flat ribbons. Fig. 2 is a section on line 2 2 of Fig. 1. Fig. 3 is a plan, partly in section, of a square ring or frame joint with flat ribbons. Fig. 4 is a section on line 4 4 of Fig. 3. Fig. 5 is a plan, partly in section, of a square ring or frame joint with vertical or edge-up ribbons. Fig. 6 is a section on line 6 6 of Fig. 5.

Referring to Figs. 1 and 2, 1 is a round rod, which it is desired shall be mounted by a universal or gimbal joint about the center 2 of the section illustrated as an axis of oscillation in any direction. 3 is a round ring of rectangular cross-section, through which the rod 1 passes and fits as tightly as may be required. 4 is a second round ring of rectangular cross-section concentric with the ring 3, standing outside it in the same plane and of about double diameter. 5 5 are a pair of flat ribbons of steel or equivalent elastic material. Each is made fast by its ends to the two rings, the two alined opposite to each other, both in the horizontal plane that intersects the two rings 3 4. To facilitate the connection of the ribbon ends with the rings 3 4, respectively, both rings are split along the central horizontal plane, as indicated by the contrasted sectioning of the two halves of the ring 3 in Fig. 2. The ends of the ribbons are laid between the two halves, and screws 6 6 are passed down through one half-ring and the ribbon ends down into the opposite half-ring. 7 7 are a pair of stationary blocks. They stand outside the ring 4, opposite to each other and at about the same distance from it as the ring 4 from the ring 3. They not only stand diametrically opposite to each other, as do the two ribbons 5 5, but the diameter that connects them is at right angles with the diameter that connects the said two ribbons. 8 8 are a second pair of ribbons connecting the ring 4 to the pair of stationary blocks 7 7 in exactly the same way as the pair 5 5 connect the ring 3 to the ring 4. They are flat, as are the ribbons 5 5, of the same dimensions, stand in the same plane, and are held to the rings 4 and blocks 7 by screws 9 in the same way. They likewise stand exactly opposite to each other and at right angles with the pair 5 5. The combination of rings, blocks, and ribbons being as above described, it is evident that the strains in the joint when it is in action fall upon one or both of the pairs of ribbons and that such strains are torsional. The amount of resilience in the ribbons 5 5 8 8 need not be more than is sufficient to return them into their normal positions after they have been bent out of them by the working of the joint. They are not called upon to either support the weight of the rings 3 4 or that of the rod 1 or its equivalent or to return either of the three to its normal position. To prevent the action of the ribbons 5 5 8 8 being interfered with by the convex and concave contours of the two rings 3 4 where the respective ribbons join them, the said contours 10 are straight there in order that the respective ribbons shall be pinched straight across them, as shown in Fig. 1.

Referring to Figs. 3 and 4, 1 is the central rod, and 2 its axis of oscillation. The round rings 3 4 of the construction illustrated in Figs. 1 and 2 and described therewith are replaced by two rectangular frames. 11 is the inner frame, on which the rod 1 or its equivalent fits in the same way as described with reference to the rod 1 and the ring 3 of Figs. 1 and 2 and is so for the equivalent of the ring 3. 12 is the outer frame and is the equivalent of the ring 4. The adjacent sides 13 of the two frames fit up to each other and when the joint is in action rub over each other, the outer frame 12 supporting the inner one 11. 14 14 are clearance-spaces between each end of the inner frame 11 and the opposite end of the outer frame 12. 15 15 are the pair of ribbons connecting the two frames 11 and 12. In respect of function, position, and method of fixation to the respective frames they are counterparts of the ribbons 5 5 above described. 16 16 are their holding-screws; but as the sides 13 of the two frames 11 12 fit up to each other there is a rectangular notch or indentations 17 in each side of the outer frame to make room for the respective ribbon 15. 18 18 are the pair of stationary blocks corresponding with the pair 7 7 of Figs. 1 and 2. The ends of the frame 12 fit up to the faces 19 of the respective block 18 and rub over them when the joint is working, receiving support therefrom in the same way as the sides 13 of the frame 11 from the adjacent sides of the frame 12. 20 20 are the pair of ribbons connecting the frame 12 by its ends to the respective block 18 and correspond with the ribbons 8 8 of Figs. 1 and 2 in function, position, and method of fixation to the frame 12 and blocks 18; but as the ends of the frame 12 fit up to the respective blocks 18 there is a rectangular notch or indentation 21 in each block 18 to make room for the respective ribbon 20. 22 22 are the screws holding the said ribbons to the respective end of the frame 12 and block 18.

It is immaterial for the purpose of the invention, seeing that the strains on the ribbons are torsional only, whether they be flat, as illustrated in Figs. 1 to 4 and described therewith. They may be edge up, as shown in Figs. 5 and 6. 1 is the rod, and 2 its axis of oscillation, as already described. 23 is the inner frame, 24 the outer one, the sides 25 of the former fitting up to the adjacent sides of the frame 24 in the same way as the sides 13 in Figs. 3 and 4; but the ends 26 of the inner frame 24 are convex, fitting up to the correspondingly concave ends 27 of the outer frame 24. This combination of concave and convex ends 26 and 27 is instead of the clearance-spaces 14 of Figs. 3 and 4 and provides for the inner frame being supported at its ends as well as over its sides. 28 28 are the ribbons connecting the two frames 23 and 24. The two frames are shown as split centrally to receive the ends of the ribbons. 29 29 are the holding-screws. 30 30 are the indentations in the sides of the outer frame 24 to make room for the said ribbons. 31 31 are the stationary blocks, 32 32 the indentations to make room for the ribbons 33 33, which connect the outer frame 24 to them, and 34 34 the screws to hold the said ribbons to the respective block and frame.

I claim—

In a universal or gimbal joint, the combination of inner ring or frame; outer ring or frame; two flexible and elastic ribbons connecting the two rings, one standing opposite to the other; two stationary blocks outside the outer ring or frame; two flexible and elastic ribbons connecting the outer ring to the said block, one standing opposite the other and at right angles with the first-mentioned two.

In testimony that I claim the foregoing as my invention I have signed my name in presence of two subscribing witnesses.

MARK BARR.

Witnesses:
 HENRY HASPER,
 WOLDEMAR HAUPT.